(No Model.)
J. H. GERRY & C. E. LONG.
SECONDARY BATTERY.
No. 478,230. Patented July 5, 1892.
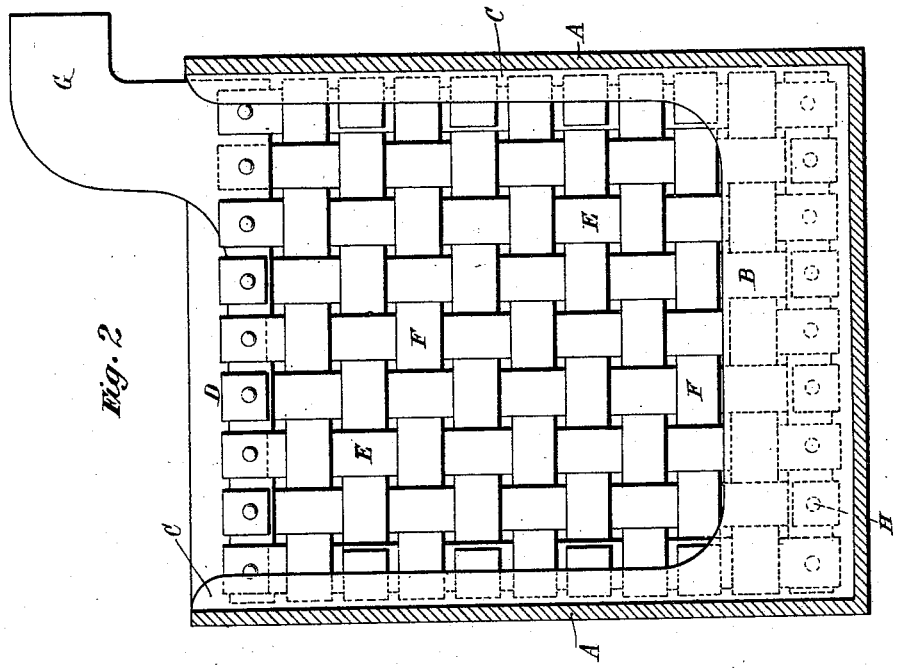
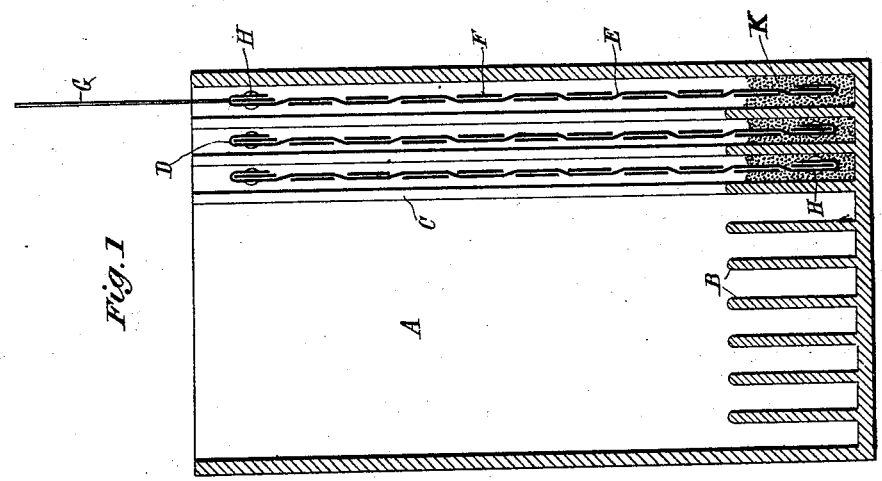
Witnesses:
Raphaël Netter
Frank B. Murphy.
Inventors
James H. Gerry
and Charles E. Long
by
Duncan & Page
Attorneys

UNITED STATES PATENT OFFICE.

JAMES H. GERRY, OF BROOKLYN, AND CHARLES E. LONG, OF NEW YORK, N. Y., ASSIGNORS TO THE GERRY-LONG MANUFACTURING COMPANY, OF JERSEY CITY, NEW JERSEY.

SECONDARY BATTERY.

SPECIFICATION forming part of Letters Patent No. 478,230, dated July 5, 1892.

Application filed August 1, 1891. Serial No. 401,367. (No model.)

*To all whom it may concern:*

Be it known that we, JAMES H. GERRY, residing at Brooklyn, in the county of Kings, and CHARLES E. LONG, residing at New York, in the county of New York, State of New York, citizens of the United States, have invented certain new and useful Improvements in Secondary Batteries, of which the following is a specification, reference being had to the drawings accompanying and forming a part of the same.

Our invention is an improvement in secondary or storage batteries; and it consists in a battery having the following general characteristics: We employ a cell, which may be molded of glass or any plastic material, or which may be built up of a number of parts, but which differs from the ordinary cells in having a number of insulating-partitions in the bottom extending up a short distance and forming narrow and shallow troughs or compartments at the bottom of the cell. These partitions we also extend up along the sides of the cell in narrow strips to form vertical grooves along the sides of the cell, into which the plates are lowered and by which the plates are maintained in proper position and prevented from coming in contact with one another.

In each of the divisional spaces formed by the above-described partial partitions we place a lead plate, preferably composed of interwoven strips or ribbons of metallic lead. In the shallow troughs between the bottom partitions and on opposite sides of each plate contained therein we then place a small quantity of an active material, using, preferably, for this purpose powdered peroxide of lead, and filling the spaces with this material nearly up to the edge of the insulating-partitions.

We have found such a battery to be extremely economical in construction and after proper charging to be a most efficient and desirable form of electrical accumulator. The liability of the battery to become short-circuited or to get out of order is very slight, its weight for a given capacity is comparatively light, and its operation or action, to whatever cause it may be due, compares favorably with the best secondary batteries now made.

In the accompanying drawings a cell of the above description is illustrated, Figure 1 being a vertical section of the cell at right angles to the plane of the plates, and Fig. 2 a section parallel to the plates.

A designates the containing cell or case.

B B are low partitions of insulating material extending across the bottom of the cell and of a height not greater than about one-fourth the depth of the cell. Along the sides of the cell these partitions are shown as extending up vertically in considerably narrower tongues or projecting strips C, thus forming narrow compartments or spaces for the plates insulated from each other only by the partitions B and the narrow side strips C.

The cell may be molded in one piece or the partitions may be made independently and inserted therein in any desired manner.

Each of the divisional spaces contains a single plate D. While for the main purposes of this invention any form of lead-plate may be used, we have found it advantageous to use plates composed of woven strips or ribbons of metallic lead, as indicated in the drawings. These plates are composed of a number of vertical strips E and horizontal strips F, interwoven like a fabric, the upper horizontal strip being widened out and formed with a tongue G for purposes of electrical connection. At the edges of the plate the strips are bent over and secured by lead rivets H H. These plates are passed down into the several compartments of the cell and on opposite sides of the lower edge of each plate, and in the troughs formed by the insulating-partitions B a quantity of active material K is lightly packed in. The plates are connected up in the ordinary manner as positive and negative, and the battery is then ready for charging.

We are aware that metallic plates have been used in secondary batteries coated with an active material or embedded in an active material separated by porous or perforated diaphragms or partitions. We believe that experience has demonstrated that the latter form of battery is not desirable or practically adapted for general use. We find, however, that our construction of cell and arrangement of plates constitute a battery in which these objections are not present.

What we claim, therefore, is—

1. In a secondary battery, the combination, with a cell containing shallow compartments or troughs formed by insulating-partitions and containing active material, of lead plates arranged in said cell with their lower edges extending down into the active material, as set forth.

2. In a secondary battery, the combination, with a cell formed or provided with narrow insulating-partitions across the bottom and up the sides, dividing said cell into a number of shallow troughs at the bottom and grooves up the sides, of active material contained in the troughs, and lead plates, the lower edges of which extend down into the active material in the said troughs, as herein set forth.

3. The combination, with a cell the bottom of which is divided by low insulating-partitions into a series of vertical troughs, an active material contained in said troughs, and positive and negative plates composed of woven strips or ribbons of metallic lead with their lower edges extending down into the active material in said troughs, as herein set forth.

JAMES H. GERRY.
CHARLES E. LONG.

Witnesses:
PARKER W. PAGE,
MARCELLA G. TRACY.